United States Patent
Gudivada et al.

(10) Patent No.: US 8,229,218 B2
(45) Date of Patent: Jul. 24, 2012

(54) EFFICIENT HISTOGRAM GENERATION

(75) Inventors: Rajaram Gudivada, Nuziveedu (IN); Philips Koshy, Chengannur (IN); Amit Ahuja, Meerut (IN)

(73) Assignee: NVIDIA Corporation, Santa Clara, CA (US)

( * ) Notice: Subject to any disclaimer, the term of this patent is extended or adjusted under 35 U.S.C. 154(b) by 955 days.

(21) Appl. No.: 11/762,061

(22) Filed: Jun. 13, 2007

(65) Prior Publication Data

US 2008/0312874 A1 Dec. 18, 2008

(51) Int. Cl.
*G06K 9/00* (2006.01)
(52) U.S. Cl. ........................................ 382/168
(58) Field of Classification Search ............... 382/168
See application file for complete search history.

(56) References Cited

U.S. PATENT DOCUMENTS

| | | | | |
|---|---|---|---|---|
| 5,881,096 A | * | 3/1999 | Majkrzak et al. | 375/133 |
| 7,506,135 B1 | * | 3/2009 | Mimar | 712/22 |
| 2004/0135903 A1 | * | 7/2004 | Brooks et al. | 348/231.99 |
| 2007/0154089 A1 | * | 7/2007 | Kao | 382/168 |
| 2008/0158430 A1 | * | 7/2008 | Hu | 348/672 |

* cited by examiner

*Primary Examiner* — Bernard Krasnic

(57) ABSTRACT

A processor generating a histogram of a set of data values receives a data value, and sets a corresponding register in each of two sets of registers based respectively on a decoded value represented by bits in a first and second set of positions in the received data value. The processor then simultaneously increments/updates each of multiple frequency counters (specifying frequency of occurrence of respective data values/ranges) by a value of a corresponding register in one of the two sets of registers if a value of a corresponding register in the other one of the two sets of registers is set. As a result, histogram generation is made efficient and fast. In an embodiment, 32 frequency counters are updated in 16 operations.

13 Claims, 4 Drawing Sheets

EFFICIENT HISTOGRAM GENERATION

BACKGROUND

1. Field of Disclosure

The present disclosure relates generally to digital systems, and more specifically to an efficient technique for histogram generation.

2. Related Art

A histogram generally refers to a bar graph representing a frequency distribution of data values in a set of data. Typically, one axis of the bar graph represents different possible values or ranges, and the other axis represents the frequency (number of occurrences) of corresponding value/range.

It is generally desirable to generate a histogram while meeting various requirements, for example, quickly and in reduced number of processing cycles of a digital processing system.

BRIEF DESCRIPTION OF THE DRAWINGS

Example embodiments will be described with reference to the following accompanying drawings, which are described briefly below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

An aspect of the present invention enables quick determination of a histogram representing a frequency of occurrence of each range in input data stream. In an embodiment, only one of a first set of storage elements is set to 1 and the rest of the first set of storage elements are set to 0 based on a decoded value represented by bits in a first set of positions of a data value sought to be processed. Similarly, only one of a second set of storage elements is set to one logical value and the rest of the second set of storage elements are set to another logical value based on a decoded value represented by bits in a second set of positions of the data value.

Multiple additions are performed simultaneously, with a value of a corresponding storage element in the first set of storage elements being added to a corresponding counter if a value of a corresponding storage element in said second set of storage elements is set to the one logical value. Only one counter, which represents the range in which the data value falls, is incremented. Thus, the counters would contain the points of the histogram as desired.

In an embodiment, a SIMD (single instruction, multiple data) instruction is used to perform two additions simultaneously (same instruction cycle).

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the features of the invention.

2. Definitions

The following includes definitions of selected terms used throughout the disclosure. Both singular and plural forms of all terms fall within each meaning:

Image: A picture represented by the light captured by an image capture device.

Frame: A set of pixel values representing a captured image viewed as a two dimensional area.

Pixel: A smallest picture element captured by the image capture device.

Pixel value: The value representing the brightness/intensity and color of a pixel.

3. Example Environment

Figure 1:
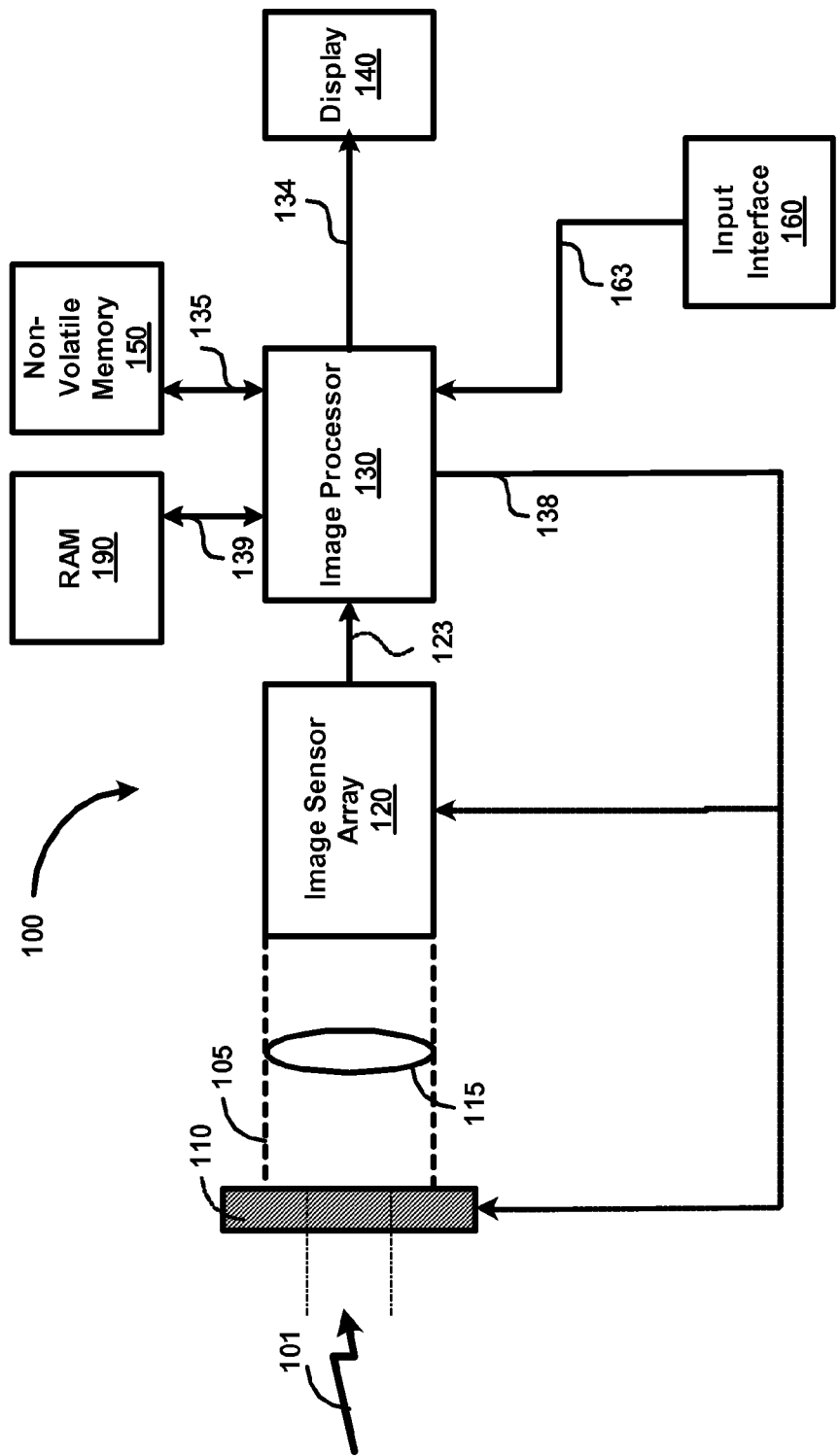
FIG. 1 is a block diagram of an example environment in which several aspects of the present invention may be implemented.

FIG. 1 is a block diagram of an example environment in which several aspects of the present invention may be implemented. Camera 100 is shown containing lens enclosure 105, shutter assembly 110, lens assembly 115, image sensor array 120, image processor 130, display 140, non-volatile memory 150, input (I/P) interface 160, and RAM 190. A typical camera may contain more components, but are not shown as not being relevant to an understanding of the following description. Each component of FIG. 1 is described in detail below.

Lens enclosure 105 (denoted by dotted lines) is shown housing lens assembly 115 and image sensor array 120, and is generally designed to shield extraneous (i.e., other than the light being received via the lens assembly) light from being incident on image sensor array 120. Lens assembly 115 may contain one or more lenses, which can be configured to focus light rays (denoted by arrow 101) from a scene to impinge on image sensor array 120.

Image sensor array 120 may contain an array of sensors, with each sensor generating an output value representing the corresponding point (small portion or pixel) of the image, and proportionate to the amount of light that is allowed to fall on the sensor. The output of each sensor may be converted to a corresponding digital value (for example, in RGB format). The digital values (representing corresponding pixel intensities in the image) produced by the sensors are forwarded on path 123 to image processor 130 for further processing.

Shutter assembly 110 operates to control the amount of light (101) entering lens enclosure 105, and hence the amount of light falling/incident on image sensor array 120. Shutter assembly 110 may be operated to control either a duration (exposure time) for which light is allowed to fall on image sensor array 120, and/or a size of an aperture of the shutter assembly through which light enters the camera.

Lens enclosure 105, image sensor array 120 and shutter assembly may be controlled by image processor 130 (via path 138) to effect features such as auto-exposure, auto focus etc.

Display 140 displays an image frame in response to the corresponding display signals received from image processor 130 on path 134. Display 140 may also receive various control signals (not shown) from image processor 130 indicating, for example, which image frame is to be displayed, the pixel resolution to be used etc. Display 140 may also contain memory internally for temporary storage of pixel values for image refresh purposes, and is implemented in an embodiment to include an LCD display.

Input interface 160 provides a user with the facility to provide inputs (via path 163), for example, to select features such as whether auto-exposure is to be enabled/disabled. The user may be provided the facility of any additional inputs, as described in sections below.

RAM 190 stores program (instructions) and/or data used by image processor 130. Specifically, pixel values that are to be processed and/or to be user-used later, may be stored in RAM 190 via path 139 by image processor 130.

Non-volatile memory 150 stores image frames received from image processor 130 via path 135. The image frames may be retrieved from non-volatile memory 150 by image processor 130 and provided to display 140 for display. In an embodiment, non-volatile memory 150 is implemented as a flash memory. Alternatively, non-volatile memory 150 may be implemented as a removable plug-in card, thus allowing a user to move the captured images to another system for viewing or processing or to use other instances of plug-in cards.

Non-volatile memory 150 may contain an additional memory unit (e.g. ROM, EEPROM, etc.), which store various instructions, which when executed by image processor 130 provide various features of the invention described herein. In general, such memory units (including RAMs, non-volatile memory, removable or not) from which instructions can be retrieved and executed by processors are referred to as a computer/machine readable medium.

Image processor 130 operates to process pixel values generated by image sensor array 120, and may implement various image processing algorithms. In an embodiment, image processor 130 generates a histogram of pixel values (received from image sensor array 120) in an efficient and fast manner. Accordingly, relevant portions of image processor 130 are described next.

4. Image Processor

Figure 2:
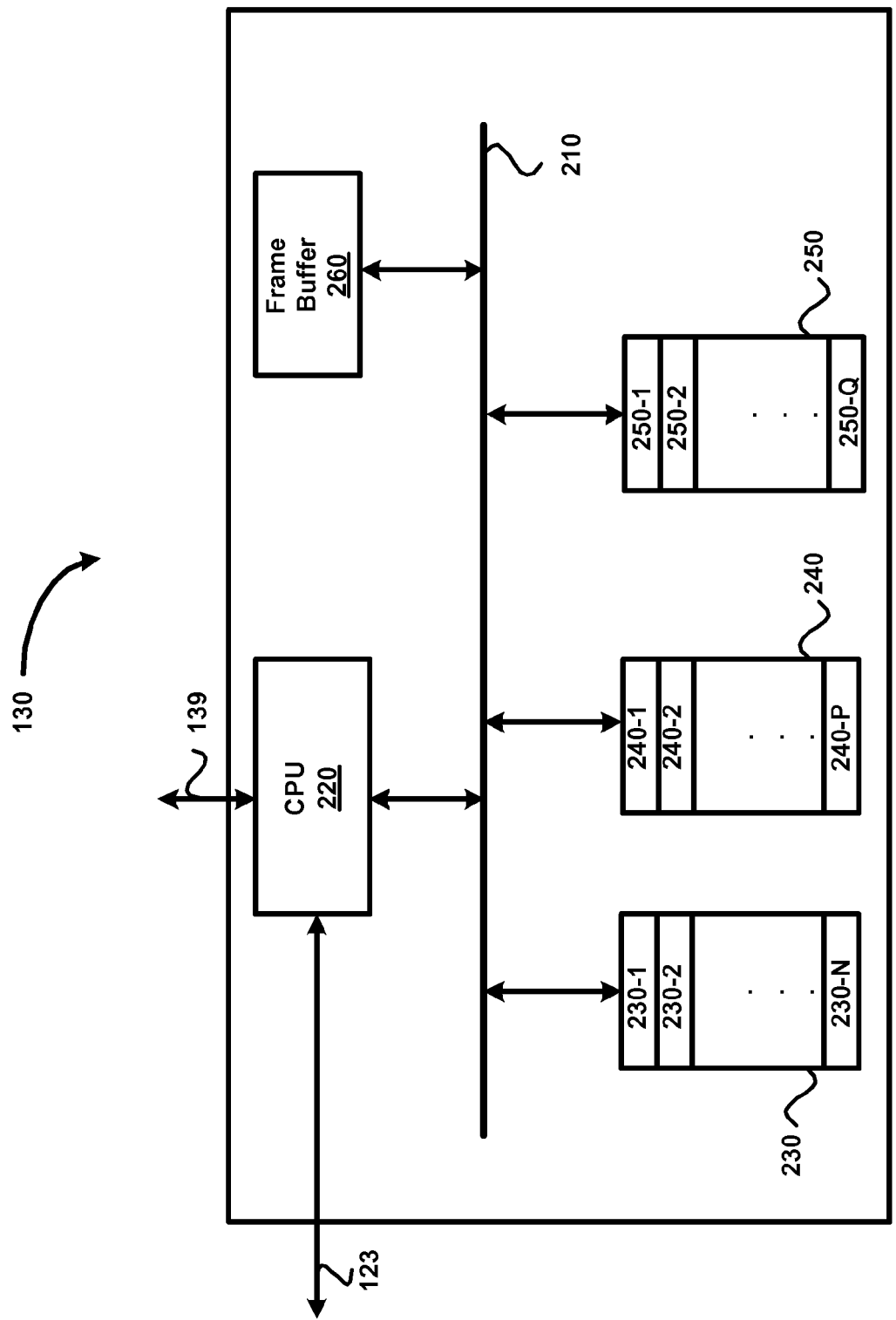
FIG. 2 is a block diagram of portions of a processor implementing several aspects of the present invention in an embodiment.

FIG. 2 is a block diagram of portions of image processor 130 in one embodiment. Image processor 130 is shown containing CPU 220, register banks 230, 240 and 250, and frame buffer 260. CPU 220 communicates with register banks 230, 240 and 250 and frame buffer 260 via bus 210.

Frame buffer 260 stores pixel values of a portion of a frame of an image. Each of register banks 230, 240 and 250 operates as a storage element, and may contain multiple registers indicated in FIG. 2 as registers 230-1 through 230-N, 240-1 through 240-P and 250-1 through 250-Q respectively. However, at least some of the storage elements may be implemented using other structures (potentially external to image processor 130) such as memory locations.

CPU 220 may retrieve pixel values from RAM 190, and store the pixel values in frame buffer 260 for faster (future) access. In processing the pixel values CPU 220 may generate and store temporary values in one or more of registers in the register banks.

CPU 220 may be implemented such that it can process multiple data (sets of data) in a single operation. For example, CPU 220 may be implemented as a single instruction stream, multiple data stream (SIMD) processor capable of adding data in two pairs of registers in a single operation (instruction), i.e. simultaneously/parallelly, and its operation is described below with respect to examples.

CPU 220 may generate a histogram of pixel values in an efficient and fast manner as illustrated next with respect to a flowchart.

5. Efficient Histogram Generation

Figure 3:
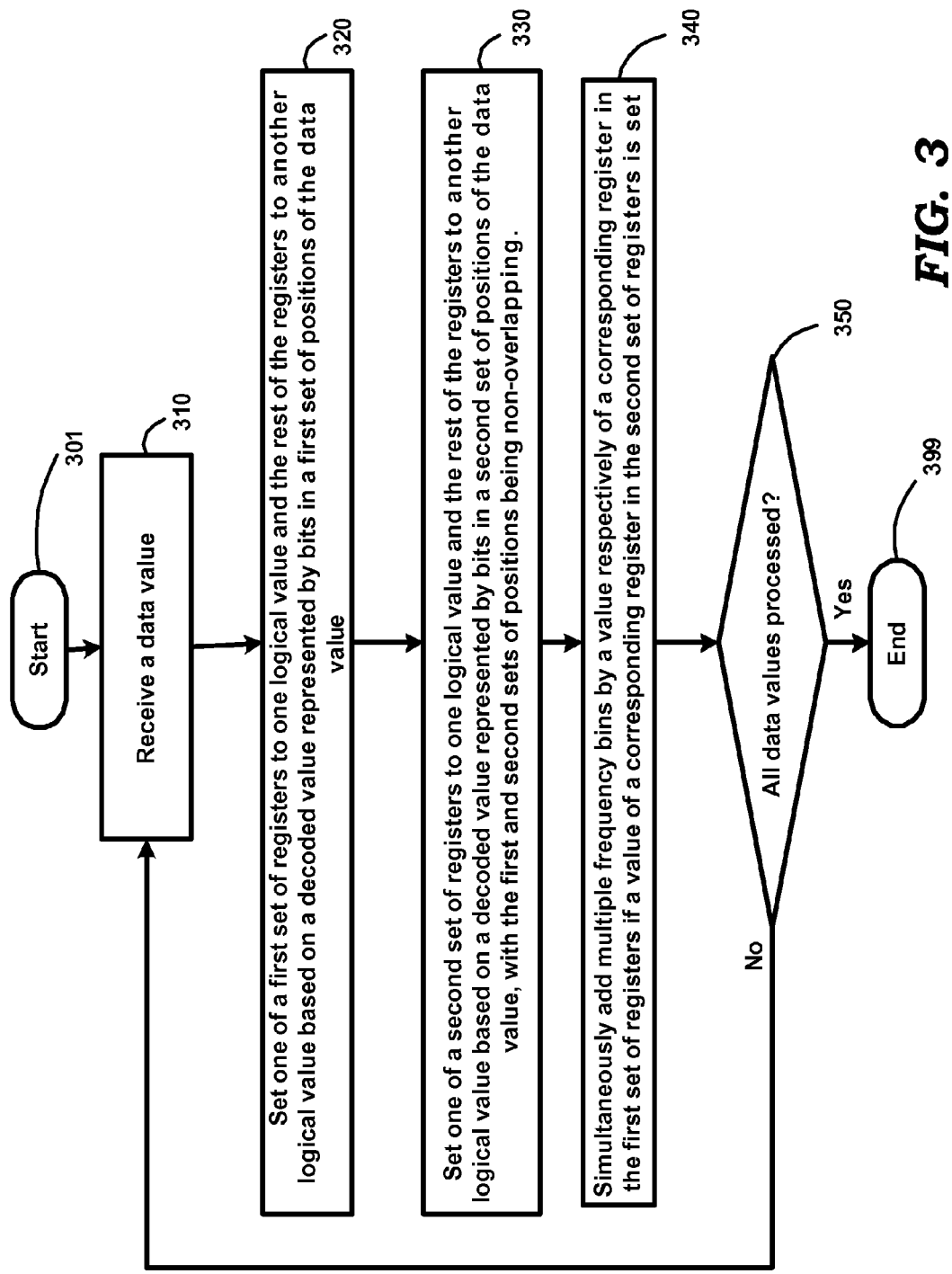
FIG. 3 is flowchart illustrating the manner in which a histogram of data values may be generated according to an aspect of the present invention.

FIG. 3 is flowchart illustrating the manner in which a histogram of data values may be generated according to an aspect of the present invention. The data values may correspond, for example, to the pixel values representing intensities of pixels of a frame in an image. The flowchart is described with respect to FIG. 2, and in relation to CPU 220, merely for illustration. However, various features can be implemented in other environments and other components. Furthermore, the steps are described in a specific sequence merely for illustration.

Alternative embodiments in other environments, using other components, and different sequence of steps can also be implemented without departing from the scope and spirit of several aspects of the present invention, as will be apparent to one skilled in the relevant arts by reading the disclosure provided herein. The flowchart starts in step 301, in which control passes immediately to step 310.

In step 310, CPU 220 receives a data value. With respect to FIG. 2, CPU 220 retrieves an 8-bit pixel value representing an intensity of a pixel (for example, in YUV space) from either frame buffer 260 or RAM 190 (FIG. 1). Control then passes to step 320.

In step 320, CPU 220 sets only one of a first set of registers to one logical value and the rest of the registers to another logical value based on a decoded value represented by bits in a first set of positions of the data value. As may be appreciated, there are (2N) possible decoded values for a N bit value, and thus one of (2N) registers is chosen depending on the specific value of the N bits of the data value (wherein '' represents the power of operation). In an embodiment, each of (2N) registers is associated with a corresponding possible value and the associated register is set to the one logical value and the remaining ones of the first set of registers are set to another logical value. Control then passes to step 330.

In step 330, CPU 220 sets only one of second set of registers to one logical value and the rest of the registers to another logical value based on a decoded value represented by bits in a second set of positions of the data value, with the first and second sets of positions being non-overlapping. For simplicity it assumed that in both steps 320 and 330, the corresponding one register is set to 1 and the remaining registers are set to 0. Control then passes to step 340.

In step 340, CPU 220 simultaneously adds multiple frequency counters by the value respectively of a corresponding register in the first set of registers if a value of a corresponding register in the second set of registers is set to the one logical value noted above. As a result, only one of the counters is incremented based on the register values set. Control then passes to step 350.

In step 350, CPU 220 checks whether there are additional data values. Control passes to step 310 if there are additional data values, and to step 399 otherwise, in which the flowchart ends.

Thus, at the end of execution of the above flowchart, each counter may contain the count (frequency of occurrence) of the corresponding data value/range, as illustrated in detail next with the help of examples.

6. Example

The following description illustrates with an example the manner in which CPU 220 generates a histogram of intensities of pixel values (pixel intensity values) of a frame of an image. The description is provided with respect to updation of frequency counters upon receiving a single intensity value. CPU 220 may retrieve the pixel intensity value from frame buffer 260 or RAM 190 (FIG. 1). The example is illustrated with respect to FIG. 4.

The example illustrates a scenario in which the pixel intensity values are eight bits wide (with values in the range 0 to 255), and the histogram contains 32 frequency counters, with each counter specifying the number of occurrences of intensity values in a corresponding range of eight values. Thus, counter-1 specifies how many pixels are present with (pixel) values in the range 0 to 7, counter-2 specifies how many intensity values are in the range 8 to 15 and so on, with counter-32 specifying how many intensity values are in the range 248-255.

Figure 4:
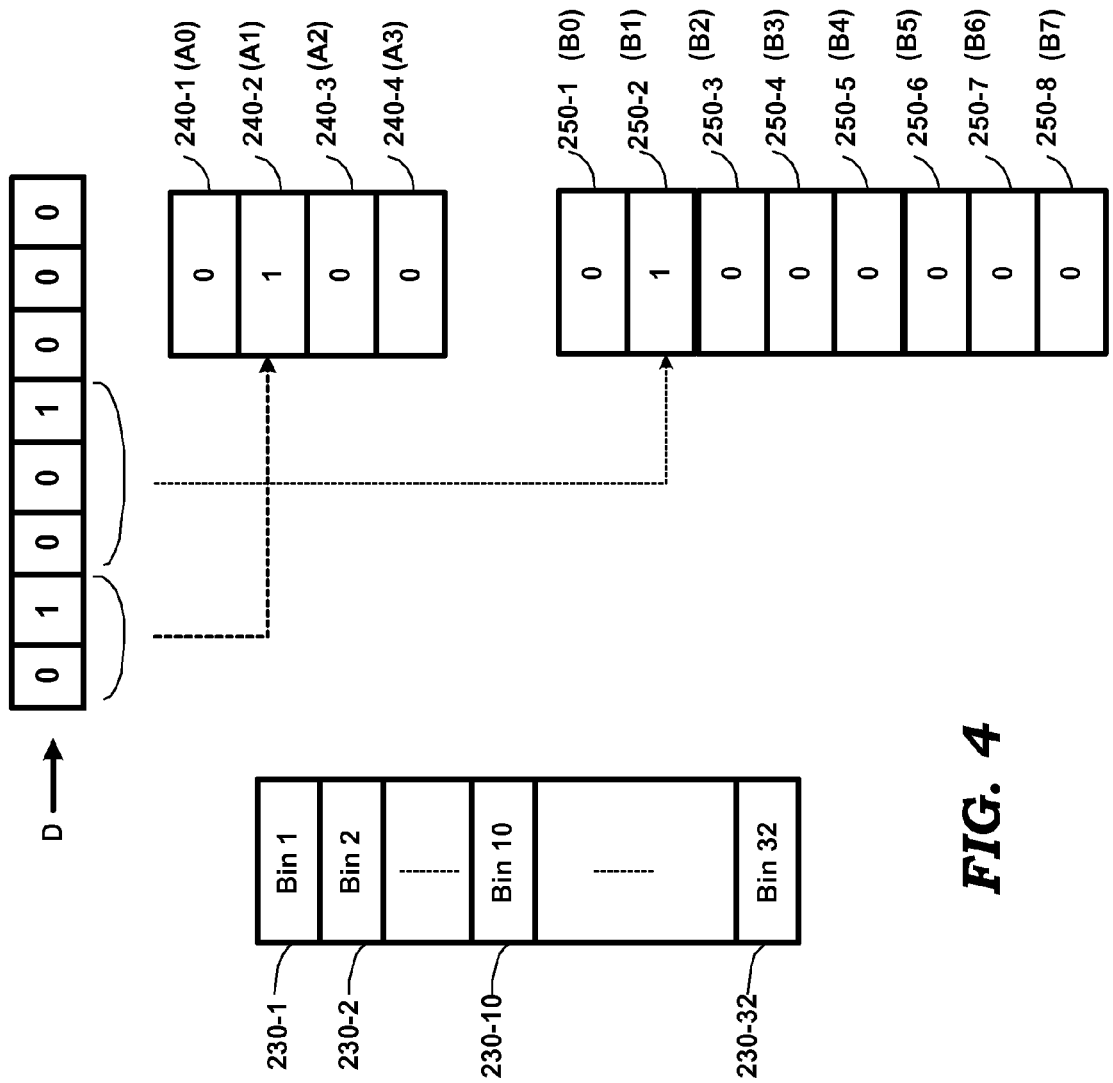
FIG. 4 is a diagram used to illustrate the use of internal registers in a processor generating a histogram in an embodiment.

CPU 220 stores the entries of counters 1 through 32 in respective registers 230-1 through 230-32 contained in register bank 230, as shown in FIG. 4. During processing of an input pixel intensity value CPU 220 stores temporary flag values in registers 240-1 through 240-4 (first set of register, also referred to as flags A0 through A3), and registers 250-1 through 250-8 (second set of registers, also referred to as flags B0 through B7). Registers 240-1 through 240-4 are contained in register bank 240, while registers 250-1 through 250-8 are contained in register bank 250.

As an example, assume that CPU 220 receives a data 'D' representing an intensity value of 72 (decimal), i.e., 01001000 (binary), as shown in the Figure. CPU 220 then determines the value of the intensity, and update the frequency value in the corresponding frequency counter (counter-10 which specifies the number of intensity values in the range 72 through 79).

CPU 220 determines the value represented by the seventh and sixth bits (first set of positions) of 'D', and updates the set of flags A0 through A3 (first set of flags). Assuming flags A0 through A3 are numbered (or associated with) 0 through 3 respectively, CPU 220 sets to logic 1 the flag whose number matches the value/number represented by the combination of the seventh and sixth bits of 'D', while setting to zero all other flags. Thus, in this example, flag A1 is set to 1, and flags A0, A2 and A3 are set to 0, as shown in FIG. 4.

CPU 220 then determines the value represented by the fifth, fourth and third bits (second set of positions) of 'D', and updates the set of flags B0 through B7 (second set of flags). Assuming flags B0 through B7 are numbered 0 through 7 respectively, CPU 220 sets to logic 1 the flag whose number matches the value/number represented by the combination of the fifth, fourth and third bits of 'D', while setting to zero all other flags. Thus, in this example, flag B1 is set to 1, and flags B0, B2 through B7 are set to 0, as shown in FIG. 4.

CPU 220 then updates the corresponding frequency counters, in a manner noted below. If flag B0 is a logic 1:
Counter 1 is updated by the value of flag A0.
Counter 9 is updated by the value of flag A1.
Counter 17 is updated by the value of flag A2.
Counter 25 is updated by the value of flag A3.
Else none of counters 1, 9, 17 and 25 is updated.

If flag B1 is a logic 1:
Counter 2 is updated by the value of flag A0.
Counter 10 is updated by the value of flag A1.
Counter 18 is updated by the value of flag A2.
Counter 26 is updated by the value of flag A3.
Else none of counters 2, 10, 18 and 26 is updated.
If flag B2 is a logic 1:
Counter 3 is updated by the value of flag A0.
Counter 11 is updated by the value of flag A1.
Counter 19 is updated by the value of flag A2.
Counter 27 is updated by the value of flag A3.
Else none of counters 3, 11, 19 and 27 is updated.
If flag B3 is a logic 1:
Counter 4 is updated by the value of flag A0.
Counter 12 is updated by the value of flag A1.
Counter 20 is updated by the value of flag A2.
Counter 28 is updated by the value of flag A3.
Else none of counters 4, 12, 20 and 28 is updated.
If flag B4 is a logic 1:
Counter 5 is updated by the value of flag A0.
Counter 13 is updated by the value of flag A1.
Counter 21 is updated by the value of flag A2.
Counter 29 is updated by the value of flag A3.
Else none of counters 5, 13, 21 and 29 is updated.
If flag B5 is a logic 1:
Counter 6 is updated by the value of flag A0.
Counter 14 is updated by the value of flag A1.
Counter 22 is updated by the value of flag A2.
Counter 30 is updated by the value of flag A3.
Else none of counters 6, 14, 22 and 30 is updated.
If flag B6 is a logic 1:
Counter 7 is updated by the value of flag A0.
Counter 15 is updated by the value of flag A1.
Counter 23 is updated by the value of flag A2.
Counter 31 is updated by the value of flag A3.
Else none of counters 7, 15, 23 and 31 is updated.
If flag B7 is a logic 1:
Counter 8 is updated by the value of flag A0.
Counter 16 is updated by the value of flag A1.
Counter 24 is updated by the value of flag A2.
Counter 32 is updated by the value of flag A3.
Else none of counters 8, 16, 24 and 32 is updated.

It may be observed that a same flag is used (is common) to 4 frequency counter updations. For example, flagB0 is used to update 1st, 9th, 17th & 25th counters. Similarly, flagB1 is used to update 2nd, 10th, 18th & 26th counters, and so on.

In an embodiment, CPU 220 simultaneously updates two frequency counters in a single cycle, based on a value of a single flag (among flags B0 through B7).

Thus, for example, counter 1 and counter 9 are updated simultaneously in a single operation (cycle) as given by the relations below:

$$\text{counter1} = \text{counter1} + \text{flagA0}, \text{ if flagB0}=1, \text{ otherwise counter1 is not updated.}$$

$$\text{counter9} = \text{counter9} + \text{flagA1}, \text{ if flagB0}=1, \text{ otherwise counter9 is not updated}$$

i.e., the count value in counter 1 is incremented by the value of flag A0, and the count value in counter 9 is incremented by the value of flag A1 if flag B0 has a value of logic 1.

CPU 220 updates other pairs of counters in a similar manner. Since two counters are updated in a single operation (cycle), a determination (updation) of the correct one of 32 counters may be performed in 16 operations (cycles). In contrast, a conventional approach may require 32 comparisons to determine and increment the correct counter.

Continuing with the illustration of the example, the following operation updates the 10th frequency counter:

counter2=counter2+flagA0, if flagB1=1, otherwise counter2 is not updated.

counter10=counter10+flagA1, if flagB1=1, otherwise counter10 is not updated.

Thus, CPU 220 issues a single instruction to perform the following two operations:

Add the contents of register 240-1 (flag A0) to register 230-2 (counter2) if entry in register 250-2 (flag B1) is a logic 1.

Add the contents of register 240-2 (flag A1) to register 230-10 (counter10) if entry in register 250-2 (flag B1) is a logic 1.

It may be noted that the above operation will increment the count value in register 230-10 (counter 10) by a value of 1 (being the contents of register 240-2/flag A1). Thus, assuming processor 220 (or image processor 130) processes a single pixel at a time, the approach described above may be used to halve the number of operations required to collect the histogram.

In an embodiment, CPU 220 issues SIMD (single instruction, multiple data) instructions to update the 32 counters. In one embodiment, a single instruction comprises a SIMD (Single Instruction, Multiple Data) instruction and the processor issues a sequence of the SIMD instructions in successive cycles to increment only one of the first plurality of registers (or storage elements) to update one of the counts corresponding to the data value (or first digital value). Accordingly, an assembly code listing of the instructions and their description is provided next.

7. SIMD Instructions

An instruction format of an SIMD instruction used by CPU 220 to update frequency counters is provided below:

ADD2 regD0 regD1 regX0 regx1 regY0 reg11 regF

Wherein, regD0 & regD1 are destination registers, regX0, regx1, regY0 & regY1 are input registers.

regF is a flag register which contains either 1 or 0.

ADD2 is an 'add' instruction which performs the following operations if a value in register F is a logic 1:

adds the contents of register X0 to the contents of register Y0, and stores the sum in register D0, adds the contents of register X1 to the contents of register Y1, and stores the sum in register D1.

Description regD0=regX0+regY0 if regF=1, otherwise regD0=previous value of regD0.

regD1=regX1+regY1 if regF=1, otherwise regD1=previous value of regD1.

An assembly code listing of the 16 instructions issued by CPU 220 to update the corresponding frequency counter on receipt of each data value (pixel intensity value) is provided below. It may be noted that in the instructions the pair destination registers is also one of the pairs of input registers.

ADD2 counter1 counter9 counter1 counter9 regA0 regA1 flagB0
ADD2 counter2 counter10 counter2 counter10 regA0 regA1 flagB1
ADD2 counter3 counter11 counter3 counter11 regA0 regA1 flagB2
ADD2 counter4 counter12 counter4 counter12 regA0 regA1 flagB3
ADD2 counter5 counter13 counter5 counter13 regA0 regA1 flagB4
ADD2 counter6 counter14 counter6 counter14 regA0 regA1 flagB5
ADD2 counter7 counter15 counter7 counter15 regA0 regA1 flagB6
ADD2 counter8 counter16 counter8 counter16 regA0 regA1 flagB7
ADD2 counter17 counter25 counter17 counter25 regA2 regA3 flagB0
ADD2 counter18 counter26 counter18 counter26 regA2 regA3 flagB1
ADD2 counter19 counter27 counter19 counter27 regA2 regA3 flagB2
ADD2 counter20 counter28 counter20 counter28 regA2 regA3 flagB3
ADD2 counter21 counter29 counter21 counter29 regA2 regA3 flagB4
ADD2 counter22 counter30 counter22 counter30 regA2 regA3 flagB5
ADD2 counter23 counter31 counter23 counter31 regA2 regA3 flagB6
ADD2 counter24 counter32 counter24 counter32 regA2 regA3 flagB7

To further illustrate the example given above, when the above code is executed upon receipt intensity value 01001000, since only flag B1 is set to logic 1, only the following two instructions will execute:

ADD2 counter2 counter10 counter2 counter10 regA0 regA1 flagB1
ADD2 counter18 counter26 counter18 counter26 regA2 regA3 flagB1

Since only register A1 has a value of 1, only counter 10 is incremented by 1, as required.

While the above example describes a technique in which two counters are updated simultaneously by issuing an instruction that adds a two pairs of registers, the technique may be extended to instructions that add more than two pairs of registers simultaneously. For example, assuming an ADD4 instruction is implemented in CPU 220, 4 counters may be updated simultaneously, and thus updating the 32 frequency bins would require only eight instructions. In general, the techniques/approach described above may be employed to generate a histogram in a fast and efficient manner.

CONCLUSION

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method for determining frequency of occurrence of each of a plurality of ranges in a plurality of data values, said method comprising:

receiving a data value contained in said plurality of data values;

maintaining a plurality of frequency counters, wherein each counter is associated with a corresponding one of said plurality of ranges;

setting one of a first set of storage elements to 1, and the rest of said first set of storage elements to 0 based on a decoded value represented by bits in a first set of positions of said data value;

setting one of a second set of storage elements to one logical value and the rest of said second set of storage elements to another logical value based on a decoded value represented by bits in a second set of positions of said data value, wherein said first set of positions and said second set of positions do not overlap;

adding simultaneously a specified multiple number of frequency counters of said plurality of frequency counters by the value respectively of a corresponding storage element in said first set of storage elements if a value of a corresponding storage element in said second set of storage elements is set to said one logical value; and wherein said data values represent pixel values of an image.

2. The method of claim 1, wherein said method is implemented in a camera.

3. The method of claim 2, wherein each one of said plurality of data values is an 8-bit binary value, said plurality of frequency counters comprises thirty two frequency counters, each frequency counter in said thirty two frequency counters having a range of eight data values, said first set of storage elements comprises four registers, and said second set of storage elements comprises eight registers, said multiple frequency counters contains two frequency counters;

said first set of positions specifies the seventh and sixth data bits of said first data value, wherein said seventh and sixth data bits are the two most significant data bits;

said second set of positions specifies the fifth, fourth and third data bits of said first data value, wherein the fifth, fourth, and third data bits are the next three most significant data bits.

4. The method of claim 3, wherein said adding simultaneously is performed by a single instruction multiple data (SIMD) instruction, wherein said instruction simultaneously adds a first value in said first set of storage elements to a count value of one of said two frequency counters, and a second value in said first set of storage elements to a count value of the second one of said two frequency counters if a first value in said second set of storage elements is set to said one logical value.

5. The method of claim 1, wherein said multiple number of frequency counters are updated in a number of cycles corresponding to half the number of multiple frequency counters.

6. A computer-readable non-transitory medium storing one or more sequences of instructions for determining frequency of occurrence of each of a plurality of ranges in a plurality of data values, wherein execution of said one or more sequences of instructions by one or more processors causes said one or more processors to perform the actions of:

receiving a data value contained in said plurality of data values;

maintaining a plurality of frequency counters, wherein each counter is associated with a corresponding one of said plurality of ranges;

setting one of a first set of storage elements to 1, and the rest of said first set of storage elements to 0 based on a decoded value represented by bits in a first set of positions of said data value;

setting one of a second set of storage elements to one logical value and the rest of said second set of storage elements to another logical value based on a decoded value represented by bits in a second set of positions of said data value, wherein said first set of positions and said second set of positions do not overlap;

adding simultaneously a specified multiple number of frequency counters of said plurality of frequency counters by the value respectively of a corresponding storage element in said first set of storage elements if a value of a corresponding storage element in said second set of storage elements is set to said one logical value; and wherein said data values represent pixel values of an image.

7. The computer-readable non-transitory medium of claim 6, wherein said one or more processors are comprised in a camera, wherein said data values represent pixel values of said image captured by said camera.

8. The computer-readable non-transitory medium of claim 7, wherein each one of said plurality of data values is an 8-bit binary value, said plurality of frequency counters comprises thirty two frequency counters, each frequency counter in said thirty two frequency counters having a range of eight data values, said first set of storage elements comprises four registers, and said second set of storage elements comprises eight registers, said multiple frequency counters contains two frequency counters, said first set of positions specifies the seventh and sixth data bits of said first data value, and said second set of positions specifies the fifth, fourth and third data bits of said first data value, wherein said seventh and sixth data bits are the two most significant data bits and wherein the fifth, fourth, and third data bits are the next three most significant data bits.

9. The computer-readable non-transitory medium of claim 8, wherein said adding simultaneously is performed by a single instruction multiple data (SIMD) instruction, wherein said instruction simultaneously adds a first value in said first set of storage elements to a count value of one of said two frequency counters, and a second value in said first set of storage elements to a count value of the second one of said two frequency counters if a first value in said second set of storage elements is set to said one logical value.

10. An apparatus for generating a histogram from a plurality of data values, said apparatus comprising:

a plurality of frequency counters;

a first set of storage elements and a second set of storage elements; and a processor coupled to a memory device having instructions stored thereon, the instructions comprising:

instructions for receiving a data value contained in said plurality of data values;

instructions for maintaining said plurality of frequency counters, wherein each counter of said plurality of frequency counters is associated with a corresponding one of a plurality of ranges;

instructions for setting one of said first set of storage elements to 1, and the rest of said first set of storage elements to 0 based on a decoded value represented by bits in a first set of positions of said data value;

instructions for setting one of said second set of storage elements to one logical value and the rest of said second set of storage elements to a another logical value based on a decoded value represented by bits in a second set of positions of said data value, wherein said first set of positions of said data value and said second set of positions of said data value do not overlap;

instructions for adding simultaneously a specified multiple number of frequency counters of said plurality of frequency counters by the value respectively of a corresponding storage element in said first set of storage elements if a value of a corresponding storage element in said second set of storage elements is set to said one logical value; and wherein said data values represent pixel values of an image.

11. The apparatus of claim 10 wherein said processor is a SIMD processor.

12. The apparatus of claim 10 wherein said processor issues a sequence of SIMD instructions in successive cycles to increment only one of said first plurality of storage elements to update one of said frequency counters corresponding to said one logical value.

13. The apparatus of claim 10 wherein each of said first plurality of storage elements and said second plurality of storage elements comprise respective registers.

* * * * *